May 24, 1932. J. TRUMMER 1,859,943
SIGNAL
Filed June 19, 1931
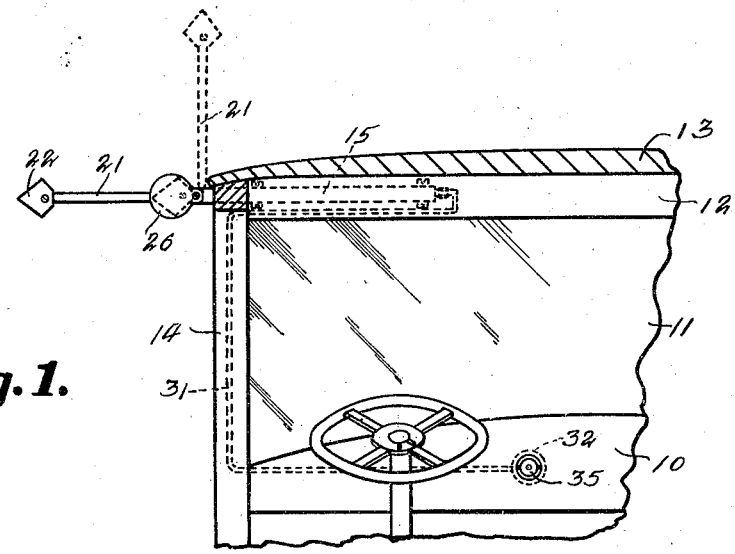
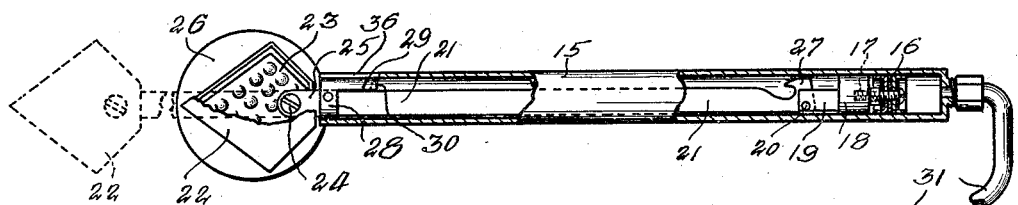
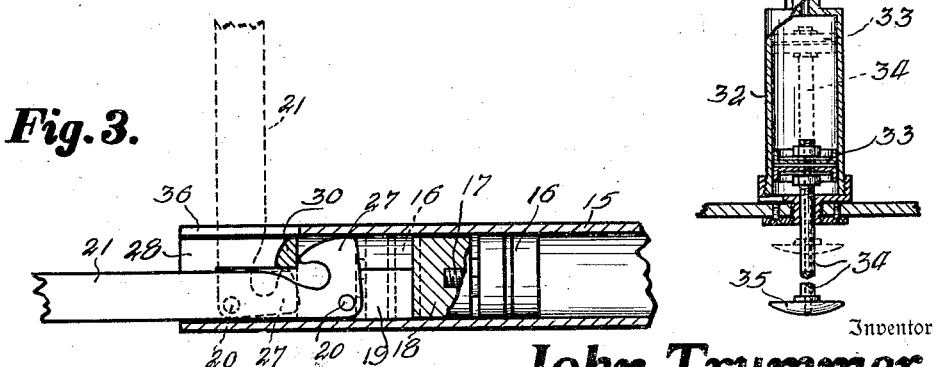
Inventor
John Trummer
By Arthur H. Sturges
Attorney Patented May 24, 1932

1,859,943

UNITED STATES PATENT OFFICE

JOHN TRUMMER, OF OMAHA, NEBRASKA

SIGNAL

Application filed June 19, 1931. Serial No. 545,569.

The present invention relates to signalling devices, and more particularly to the signal adapted for attachment to and use with a motor vehicle.

An object of the present invention is to provide a direction indicating signal which may be quickly and easily operated by the driver of the vehicle, and which embodies a simple construction wherein is eliminated a system of levers and various other intricate parts which are costly to produce, difficult of installation, and which readily get out of order.

Another object of the present invention is to provide a direction indicating signal which may be actuated by air pressure and suction, and which may be operated to various degrees for giving desired indications, all of the operations being effected from a single knob or handle which may be given one or more reciprocating operations.

A further object of the present invention is to provide a novel means for utilizing a single arm and piston whereby the arm may be projected in a straight line from the piston to extend horizontally of the vehicle, and which may be further operated so as to swing upwardly to give a different indication at the side of the vehicle, both of the operations being effected from a single piston and pressure supply device.

It is another aim of the present invention to provide a direction signal which may be operated wholly from within the vehicle so that should the driver's window be closed it is unnecessary to open the same for actuating the signal.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary sectional view showing in elevation the inner side of the driver's compartment of a motor vehicle, locking vehicle and showing in full and dotted lines the two positions of the signal.

Figure 2 is an enlarged sectional view, partly broken away of a signal of this invention.

Figure 3 is a fragmentary further enlarged section taken through the outer end of the pneumatic cylinder showing the signal arm in horizontal position in full lines and in vertical position in dotted lines, and Figure 4 is a detail top plan view of the pivoting and closure plug used in the outer end of the cylinder.

Referring now to the drawings, a portion of the motor vehicle is shown provided with an instrument board 10 above which is disposed the usual wind shield 11 mounted in a frame 12, the upper portion of which joins the top 13 of the vehicle. 14 indicates the forward corner post of the vehicle which supports the side portion of the wind shield 11. The improved signal comprises an elongated cylinder 15 open at its outer end and adapted to be horizontally secured to the upper frame part 12 of the vehicle with the open end projecting toward the left side of the vehicle, as shown in Figure 1. Within the cylinder 15 is disposed a piston 16 which comprises a plurality of washers and supporting discs therefor mounted upon a central screw 17 which is threaded into a sliding block 18. The block 18 is arranged at the outer side of the piston 16 and has a pair of forwardly projecting lugs 19 between the lower outer ends of which is pivoted upon a pin 20 the inner end of the signal arm 21. The signal arm 21 is supported along the lower side of the cylinder 15 and projects from the open end of the cylinder and carries a suitable signalling device which may be in the form of an arrow 22, or the like. This signalling device 22 may comprise a pair of side plates of suitably colored transparent material, such as celluloid or the like and between which is placed a luminous member or sheet 23.

This sheet 23 may be pressed to provide spaced projections or an otherwise formed uneven surface, so as to receive and deflect, or diffuse rays of light which may be projected upon the signalling device 22. The various plates or component parts of the signalling device 22 may be secured by a screw 24 or the like to the outer end of the arm 21 by means of ears 25 which are riveted or otherwise suitably secured to the forward or outer end of the arm 21.

When the signal is in normal or in inoperative position, as shown in full lines in Figure 2, the signal device 22 is housed between a pair of shield plates 26 which are suitably supported upon the outer end of the cylinder 15 at the front and rear sides thereof, so that the shield plates and the signalling device 22 may be supported in vertical position as shown.

The inner end of the signal arm 21 is provided with an upwardly extending heel piece 27 in the form of a hook, the nose or bill of which projects forwardly and is disposed in a plane above or beyond that of the normal upper edge of the arm 21, as clearly shown in Figure 3.

For the purpose of holding the signal arm 21 from turning, and to effect the swinging operation of the arm, the arm 21 is in the form of a flat strip of metal and a plug 28 is fitted in the outer end of the cylinder 15 and is provided in its lower portion with a vertical slot 29 of a width to freely receive the arm 21 slidably therethrough. The slot 29 extends through the plug 28 at its forward and upper portions but is interrupted at its upper rear portion by a stop shoulder 30 which comprises an integral portion of the plug 28 and which lies in the path of the heel or hook 27. It is, therefore, apparent that when the piston moves forwardly the heel 27 engages the shoulder 30 and the signal arm 21 is swung upwardly on its pivot 20 upon the further movement of the piston.

Air pressure may be supplied to the inner end of the cylinder 15 in any suitable manner and in the present instance it is supplied through a pipe 31 which may be flexible or of other suitable construction adapting it to ready installation and susceptible of wear during use, and which may be carried downwardly of the post 14 to the under side of the instrument board 10. The pipe 31 is connected to the inner end of a pump cylinder 32 which is secured in any suitable manner through the instrument board 10.

A piston 33 is disposed in the pump cylinder 32 and is mounted upon a hollow piston rod 34 which opens through the central portion of a knob or handle 35, so that the rod 34 may be closed at times by the thumb or finger of the operator when in the act of moving the piston 33. The piston 33 may be of any suitable construction to properly seal the piston in the cylinder 32 and to provide for the long wear of the piston.

In operation, after the signal is properly installed upon the vehicle, such as may be effected in accordance with the showing in Figure 1, and the signal is in normal position, as shown in Figure 2, when it is desired to signal a left hand turn or a stop, the driver has merely to grasp the knob 35 and draw it out from the instrument board 10 leaving the opening through the piston rod 34 free so that air may enter through the piston rod to the interior of the pump cylinder 32 behind the piston 33. The operator now places his thumb over the opening in the knob 35 so as to close the piston rod 34 and forces the knob 33 inwardly toward the instrument board with the result that the piston 33 forces the entrapped air from the pump cylinder 32 through the pipe 31 and into the rear end of the cylinder 15.

Depending upon the size of the pump cylinder 32, one or more pumping operations are required for the projection of the signal arm 21 into the desired position. Air entering the inner end of the cylinder 15 forces the piston 16 forwardly which in turn projects the arm 21 in the horizontal position until the heel 27 engages the stop 30. At this point the signal arm 21 is supported in horizontal position as the inner lower edge of the arm 21, as shown in Figure 3, rests against the bottom of the cylinder 15 and is supported thereon and also on its pivot 20. The arrow head or other signal device 22 which is used, is thus projected from between the shields 26 so that it stands out from the vehicle to the desired extent and may receive thereon the light rays from oncoming vehicles so as to reflect such rays backwardly or forwardly as the case may be and thus clearly show to the drivers of oncoming vehicles that a direction in movement is contemplated.

If it is desired to indicate a right hand turn wherein the signal arm 15 is to be raised, as shown in dotted lines in Figures 1 and 3, it is necessary for the operator to further actuate the piston 33 so as to force more air into the inner end of the cylinder 15.

The increased pressure thus operates against the piston 16 with the result that the heel portion 27 is forced against the stop 30 and the pressure is sufficient to force the arm 21 outwardly so that the arm must swing upwardly about its pivot 20 and upwardly through the slot 29 in the forward portion of the plug 28. The plug 28 serves to support the arm 21 from swinging forwardly or backwardly of the vehicle, and the cylinder 15 is also slotted, as shown at 36 in register with the slot 29 of the plug so that the arm 21 has free upward swinging movement.

In order to return the signal to its normal position, it is only necessary to force the knob 35 inwardly and while the piston 33 is at the inner end of the cylinder, as shown in dotted lines in Figure 2, to close the opening in the knob 35 and draw the same forwardly so as to create a partial vacuum through the pipe 31. This suction operates through the inner end of the cylinder 15 upon the piston 16 and draws the latter inwardly, first swinging the arm 21 down into horizontal position and thence withdrawing the arm into the cylinder 15 and the signalling device 22 in between the shield 26.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. A vehicle signal comprising a cylinder, a piston in the cylinder, a signal arm pivotally mounted to the piston and projecting through the forward end of the cylinder, hand operated pump means for supplying pressure to the inner end of the cylinder for moving said piston back and forth therein and projecting and withdrawing said signal arm, and means between said arm and cylinder for swinging said arm upwardly when projected to a predetermined extent from the cylinder.

2. A vehicle signalling device comprising a cylinder, a piston in the cylinder, a signal arm slidably mounted in the cylinder and connected at its inner end to said piston and provided with an upstanding heel portion, a stop carried in the outer end of the cylinder in line with said heel portion, and manually operated means for creating pneumatic pressure to the inner end of the cylinder for projecting said piston into the forward end of the cylinder for projecting said signal arm therefrom and for engaging said heel portion against said stop to swing the signal arm into raised position.

3. A vehicle signal comprising a cylinder, a piston in the cylinder, a signal arm projecting through the outer end of the cylinder and pivotally connected at its inner end to the piston, said signal arm having an upstanding heel portion at its inner end above said pivot, a stop shoulder mounted in the forward end portion of the cylinder in line with said heel portion of the signal arm, and manually operable means for producing pneumatic pressure to the inner end of the cylinder to project said piston outwardly thereof and engage the heel portion of the signal arm against said stop shoulder, whereby said signal arm is swung into vertical position.

4. A vehicle signal comprising a cylinder, a piston in the cylinder, a signal arm pivoted at its inner end to the piston and projecting through the outer end of the cylinder, a supporting and guide plug mounted in the outer end of the cylinder and having a slot through the lower and upper forward portions thereof for slidably receiving the signal arm and providing a stop shoulder at the upper inner portion of the plug, said signal arm having an upstanding heel portion at its pivoted end, and means for admitting pressure to the inner end of the cylinder for projecting the piston and arm through the outer end thereof and for engaging said heel portion against the stop shoulder to swing said arm upwardly on its pivot through the top of said plug and upwardly of the cylinder.

5. A vehicle signal comprising a cylinder adapted to be horizontally mounted on the forward end of a vehicle, a piston in the cylinder, a signal arm in the cylinder pivotally connected to the piston, a signalling device mounted on the outer end of said arm outwardly of the cylinder, said arm having an upstanding heel portion with a forwardly projecting nose at the pivoted end of the arm, a guide plug mounted in the outer end of the cylinder and having a slot therein for receiving said arm and provided with a stop shoulder across the upper inner end of the plug in line with said nose, a pipe leading from the inner end of the cylinder, a pump cylinder connected to the other end of the pipe and adapted to be mounted upon the instrument board of a vehicle, a piston in the pump cylinder, a hollow piston rod connected to the piston and projecting through the instrument board, and a thumb piece mounted on the projecting end of the piston rod and having an opening therethrough for venting the pump cylinder through the piston rod, said thumb piece adapted to be reciprocated to actuate the piston in the pump cylinder and said opening through the thumb piece adapted to be closed at times by the thumb of the operator for controlling admission of air to the pump cylinder.

In testimony whereof, I have affixed my signature.

JOHN TRUMMER.